United States Patent Office 3,489,238
Patented Jan. 13, 1970

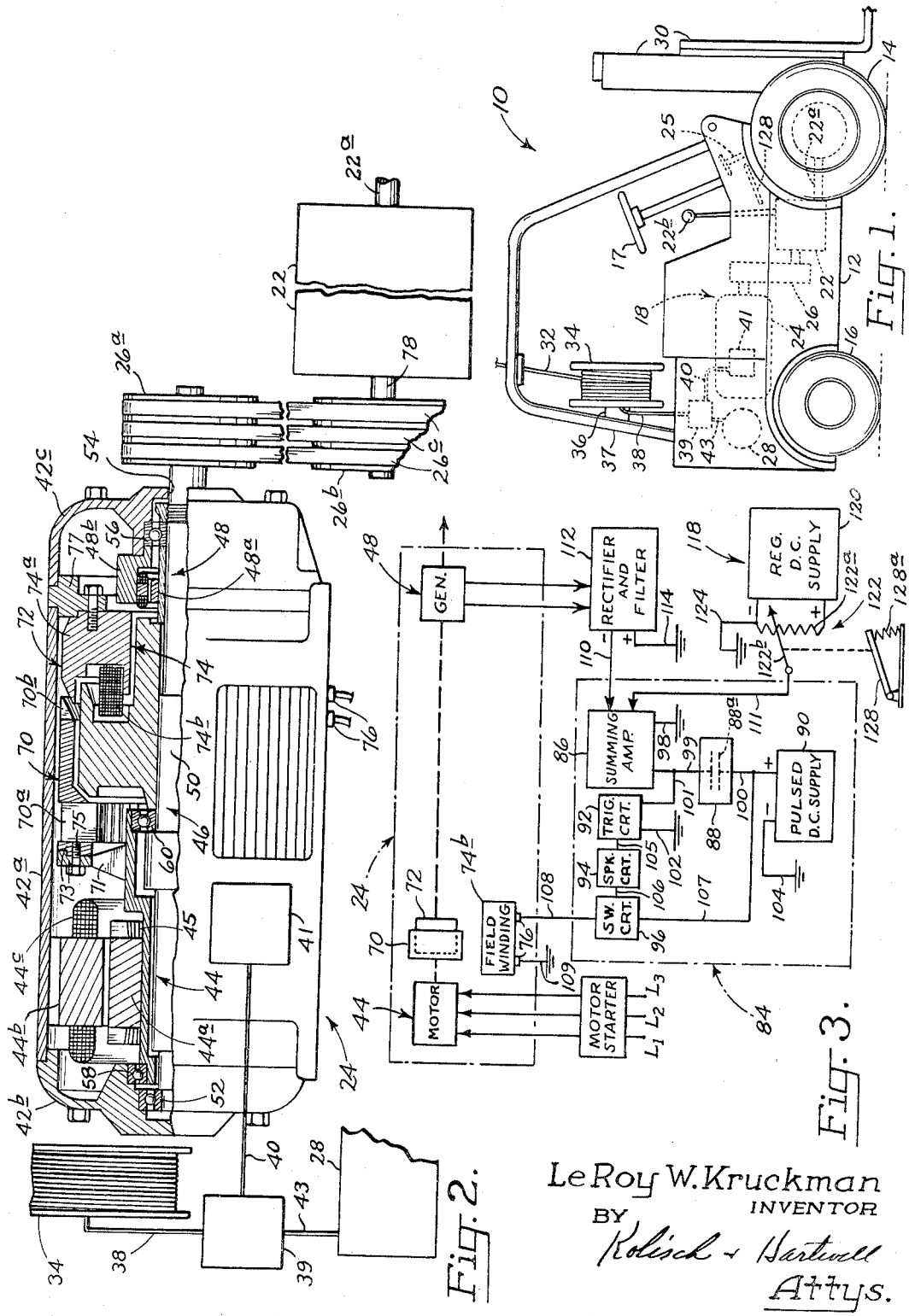

3,489,238
DRIVE MEANS FOR LOAD-HANDLING VEHICLES
Le Roy W. Kruckman, Rte. 1, Box 42,
Newberg, Oreg. 97132
Filed Mar. 20, 1967, Ser. No. 624,300
Int. Cl. B60l 9/00, 15/20; H02k 49/10
U.S. Cl. 180—105                                   1 Claim

ABSTRACT OF THE DISCLOSURE

Apparatus for propelling a vehicle at a selected constant speed including an electrically-powered constant speed motor, and an electrically-operated clutch which is adjustable to control power transmitted from the motor to the vehicle's ground supports.

---

The present invention relates to self-propelled load-handling vehicles, and more particularly to a novel speed-regulated drive means for propelling such a vehicle, found greatly to facilitate the handling of loads under difficult operating conditions. For purposes of illustration only, and not by reason of limitation, a preferred embodiment of the invention is described in connection with a fork-lift truck.

I have discovered that a significant factor contributing to the improper handling of loads with the lift-trucks of today comprises the inability of a driver fully to control truck speed both with respect to constancy and to rate. As a result of such lack of control, damaging of loads handled results, and maneuvering of the vehicle is made difficult. A particular drawback of the usual vehicle is its inability to travel over slight obstructions or other unevenness in a supporting surface, even at low speeds, without abrupt lurching and resultant jarring or displacement of the load on the vehicle.

Further explaining, while it is desirable to travel at a moderate speed when moving a load any distance over a smooth surface, in exacting operation, as when maneuvering a load into final placement, such is greatly facilitated if the vehicle is permitted to travel very slowly or "creep" while approaching and finally moving into the position it should have when depositing the load. It is also important while progressing at such a speed that a constant speed be maintained, whereby the operator may best sense the progress and position of the vehicle. The ability of a vehicle to creep forwardly at a uniform speed is an especially advantageous feature enabling a truck to be moved over an unevenness in a supporting surface, since in this way lurching of the truck and jostling of the load is effectively controlled.

Conventional lift-trucks, including the usual change speed transmission and mechanically operated clutch, have not provided requisite control, since creeping or traveling at a very low speed is only possible with riding of the clutch, which requires skill and introduces wear because of clutch slippage. Further, with conventional trucks, it is nearly impossible to maintain a constant speed while creeping under conditions where the resistance to progress abruptly changes, because of inherent slowness in the reflexes of any vehicle driver.

A general object of the present invention, therefore, is to provide, in a load-handling vehicle such as a fork-lift truck, novel drive means for propelling the vehicle which overcomes the above-mentioned deficiencies of drive systems presently known, by affording close control over vehicle movements.

More particularly, an object of the invention is to provide such drive means which is readily adjustable to propel a vehicle over the ground at various speeds, with such speeds ranging from those which are very slow (where the vehicle is barely inching along), to those which are moderately fast.

The novel drive means contemplated herein includes an infinitely adjustable, electrically-operated clutch which is adjustable to vary a vehicle's speed over a relatively wide range of speeds. The clutch employed includes relatively rotatable input and output members which remain physically disengaged, but which, with the clutch transmitting power to propel the vehicle are operatively coupled together through the action of electromagnetic fields. With the input member rotated under power at a given speed, the amount of torque applied to the output member, with coupling of the members, varies directly with the strengths of such fields. Further, and with a given load demand exerted on the output member, the rotational speed of the output member (which determines vehicle speed) varies directly with the strengths of the fields. By adjusting the strengths of the fields, therefore, speed may be varied from a very slow one to a moderately fast one. Since the input and output members are physically disengaged, such speed variation is possible without the frictional wear and damage that occurs in the usual clutch.

A further object of the invention is to provide drive means of the type so far indicated which is automatically speed regulated, whereby, with the drive means adjusted to propel the vehicle at a given speed, the vehicle's speed remains substantially constant even though encountering an obstruction abruptly increasing resistance to progress. This is accomplished by novel speed-responsive means which is responsive to the rotational speed of the clutch's output member to adjust the strengths of the fields mentioned above, whereby the output member's rotational speed tends to remain substantially constant.

Yet another object is to provide such drive means which, from an operator's standpoint, greatly simplifies speed control of a vehicle.

These and other objects and advantages attained by the invention will become more fully apparent as the description which follows is read in conjunction with the accompanying drawings, wherein:

FIG. 1 is a side elevation illustrating a fork-lift truck employing drive means constructed according to the invention;

FIG. 2 is an enlarged, somewhat simplified, partially schematic drawing, illustrating various components of the drive means used in the truck of FIG. 1; and FIG. 3 is a schematic diagram, illustrating various electrical circuits that control operation of the drive means herein.

Turning now to the drawings, and referring first to FIG. 1, illustrated generally at 10 is a load-handling vehicle which takes the form of a fork-lift truck. The truck includes a frame 12, and front and rear wheels, such as wheels 14, 16, respectively, mounted on the frame. Such wheels comprise ground-traveling support means supporting the truck for movement over the ground.

Front wheels 14 are turned by a steering wheel 17 to steer the truck, and are rotated under power to propel the truck over the ground. Power to drive the front wheels is supplied by a drive means indicated in dashed outline at 18. In general terms, drive means 18 includes a change speed transmission 22 connected through its output shaft 22a to drive wheels 14, and an electrically-operated motor unit 24 (more fully described hereinafter) which is connected to transmission 22 through a coupling 26. Change speed transmission 22 is conventional, and includes gear shift lever 22b for changing speed ranges in the transmission.

Also mounted on frame 12 is an electrically-powered hydraulic pump 28. This pump functions to supply hydraulic fluid under pressure to the usual fork-lift mechanism 30 mounted on the frame adjacent the front of the truck.

Braking of the vehicle is accomplished by operating the vehicle brake system, which may be conventional and includes the usual brake shoe moved against drums by depressing of brake pedal 25.

In the embodiment illustrated, electrical power is supplied to the truck from an external source through an elongated, flexible, electrical cable 32 containing the usual electrical conductors. Portions of the cable are stored as windings or coils on the drum of a spring-biased reel 34 adjacent the rear of the truck. The reel is mounted on a bracket 36 joined to post structure, including post 37, which extends upwardly from the frame and forms a protective canopy for an operator. Reel 34 functions to take up and pay out electrical cable as such is required to accommodate relative movement between vehicle 10 and the external source of power.

From cable 32, power is supplied to motor unit 24 through a cable 38, a switchbox 39, conductor 40 and a motor starter 41. Pump 28 receives power from switchbox 39 through a cable 43.

Considering now the various components of drive means 18 in more detail, and referring now to FIG. 2, motor unit 24 includes an elongated, somewhat cylindrical housing having a central section 42a, and end sections 42b, 42c closing off opposite ends of the central section. Mounted within the housing is an electric motor, or prime mover, 44, an electrically-operated clutch 46, and an AC voltage generator 48.

Also mounted inside the housing is an elongated, rotatable output shaft 50 which extends longitudinally through the housing. The left end of shaft 50 is journaled in a bearing 52 suitably mounted in housing section 42b. The right end of the shaft extends freely through a bore 54 provided in housing section 42c, and is supported by a bearing 56 mounted adjacent the bore.

In the embodiment illustrated herein, motor 44 takes the form of a 3-phase AC induction motor, having a rotor 44a secured to an elongated quill shaft 45, and a stator 44b mounted on housing section 42a. The quill shaft is mounted for rotation about its longitudinal axis, and surrounds a portion of the left end of shaft 50 in FIG. 2. The left end of shaft 45 is journaled in a bearing 58, and the right end of the shaft is supported by a bearing 60 interposed between shafts 45, 50. Stator 44b is provided with the usual field winding 44c.

Power to operate motor 44 is supplied from motor starter 41 through suitable conductors (not shown) connected to field winding 44c. With such power supplied, as is well understood for induction motors, rotor 44a (and hence quill shaft 45) rotates at a substantially constant speed. For example, the motor may have a rotor speed of approximately 1800 r.p.m. With loading of shaft 45, the rotor speed remains substantially so long as the load is within the rated capacity of the motor.

Clutch 46 comprises a pair of relatively rotatable members including an annular input member 70 and an annular output member 72 disposed within the input member. Member 70 is mounted on shaft 45 through radially outwardly projecting posts, such as post 71, distributed circumferentially on shaft 45, annular members 73, fasteners 75, and axially extending elements 70a. Forming a part of annular member 70, and located adjacent the right end thereof in FIG. 2, are plural, axially extending fingers, such as finger 70b. Member 70, being connected to shaft 45 through posts 71, rotates with rotation of shaft 45. Output member 72 disposed to the right of bearing 60, is secured to previously-mentioned shaft 50.

The clutch further includes a stationary field assembly, or torque-producing means, 74 disposed adjacent members 70, 72. Assembly 74 includes an annular member 74a anchored on a mount 77 which is secured to the housing. The assembly further includes a field winding 74b mounted on member 74a. The field winding, which constitutes an electrically responsive, variable, magnetic field producing means, is suitably connected to a pair of electrical input terminals 76 for the clutch which are mounted on housing section 42a.

Members 70, 72, 74a of the clutch are formed of any suitable paramagnetic material, such as iron.

Explaining briefly how the clutch operates, and assuming that initially no voltage is applied to terminals 76, with motor 44 operating, shaft 45 and clutch member 70 are rotated at the substantially constant speed of rotor 44a. No current flows in field winding 74b, and there is no appreciable magnetic field existing in the vicinity of clutch members 70, 72. Under such circumstances, substantially no coupling force exists between members 70, 72. Hence, member 72 and shaft 50 are stationary, and there is a high relative rotational speed, or slip, between members 70, 72.

Upon the application of a DC voltage to terminals 76, current flows in winding 74b and produces an electromagnetic field having a strength which is related to the magnitude of such voltage. As a result of this field, magnetic lines of force exist which pass through clutch member 72, thence through elements 70a and fingers 70b of clutch member 70, and thence in return paths through field member 74a.

Rotation of member 70 in the presence of these lines of force results in the generation of eddy currents in fingers 70b, and also in the production of an electromagnetic field related to such eddy currents. This second-mentioned field acts together with the first-mentioned field to produce a magnetic coupling force between clutch members 70, 72.

With such a coupling force existing, a torque is applied to member 72 which tends to rotate it, and hence shaft 50, in the same direction as member 70. As member 72 accelerates, member 70 continues to rotate at the constant speed of rotor 44a, and the slip between members 70, 72 decreases. The magnitude of such torque depends directly on the magnitude of voltage applied to terminals 76, and, with a given load connected to shaft 50, determines the output speed of the shaft. Thus, through adjustment of the voltage applied to terminals 76, it is possible to vary the torque applied to member 72, and the output speed of shaft 50, with the clutch illustrated, it has been found possible to vary the speed of shaft 50 from as low as about fifty (50) r.p.m., to nearly as high as the speed of rotor 44a.

It should be noted that coupling together of clutch members 70, 72 occurs without frictional engagement of the members. Thus, it is possible to vary the speed of member 72 relative to that of member 70 without producing wear and damage of the type encountered in known friction-type clutches. Hence, it is possible to employ the clutch as a speed regulator without excessive wear.

Turning now to voltage generator 48, this includes an armature 48a suitably secured to shaft 50, and a field section 48b mounted on housing section 42c. Suitable electrical output terminals (not indicated) are provided for the generator. With rotation of shaft 50, and hence of armature 48a, the generator produces at its output terminals an AC output voltage having a magnitude which is directly proportional to the rotational speed of the shaft.

While motor 44, clutch 46 and generator 48 are illustrated having certain configurations and mounted within a common housing, other configurations and separate housings are of course possible.

Further describing drive means 18, previously-mentioned coupling 26 comprises a pulley assembly 26a secured adjacent the right end of shaft 50 in FIG. 2, a pulley assembly 26b secured to an input shaft 78 for change speed transmission 22, and plural belts 26c trained over the two pulley assemblies. Mechanism 22 and clutch 46 together comprise power-transmitting means connecting the motor with the drive wheels for the truck.

Turning now to FIG. 3, which illustrates schematically electrical circuits employed herein to control operation of the drive means, indicated within the dash-dot outline 84 is control means for controlling the supply of voltage to terminals 76 of the clutch. The control means include a summing amplifier 86, a capacitor charging circuit 88 including a capacitor 88a, a supply 90 of pulsating DC power, a trigger circuit 92, a spiking circuit 94, and a spike-responsive switching circuit 96. Because amplifier 86, supply 90 and circuits 88, 92, 94 and 96 may be constructed in numerous ways each of which are well known by persons skilled in the art, the same are illustrated herein for simplicity only in block form. Further, in FIG. 3, certain components of motor unit 24, already described, are shown in block form.

Summing amplifier 86 has a pair of output terminals, one of which is grounded at 98, and the other of which is connected through a conductor 99, charging circuit 88, and a conductor 100 to the positive output terminal of supply 90. The ungrounded output terminal of amplifier 86 additionally is connected through conductor 99 and a conductor 101 to the input of trigger circuit 92. Input voltages are supplied to amplifier 86 through conductors 110, 111.

Circuit 92, and the negative output terminal of supply 90, are grounded at 102, 104, respectively. The output of circuit 92 is connected by a conductor 105 to the input of circuit 94, and the output of circuit 94 is connected to the input of switching circuit 96 by a conductor 106. Circuit 96 further is connected by a conductor 107 and conductor 100 to the positive output terminal of supply 90, and by a conductor 108 to one of the clutch's input terminals. The other clutch input terminal is grounded at 109.

Explaining briefly how various components forming control means 84 operate, amplifier 86 compares the voltages supplied to it by conductors 110, 111, and adds such voltages algebraically to produce a sum. If the sum is positive, the amplifier acts as a variable switch that allows current to flow through it from conductor 99 to ground connection 98. The amount of current permitted to flow depends directly upon the magnitude of the positive sum, and upon the voltage difference that exists between conductor 99 and ground. If the sum is zero or negative, substantially no current is permitted to flow through the amplifier.

Circuit 88 functions to control the difference that exists between the voltage on conductor 100 and that on conductor 99. With capacitor 88a initially uncharged, upon the initial application of a positive voltage to conductor 100, substantially the same positive voltage is supplied to conductor 99. Current flows through the circuit from conductor 100 to conductor 99 to charge the capacitor at a rate determined by the amount of current flowing. With charging of the capacitor, the voltage on conductor 99 drops relative to that on conductor 100 at a rate determined by the charging rate of capacitor 88a. Upon connection of any suitable low impedance circuit across circuit 88, capacitor 88a discharges, and the voltage on conductor 99 rises to substantially that which exists on conductor 100.

Trigger circuit 92 has a pair of states, in either one of which it may operate at a given time. In one of these states, called its first state, the voltage existing at its output (hence on conductor 105) is zero. In its other or second state, the voltage existing at its output is a positive, continuous DC voltage.

The trigger circuit is responsive to what may be called a threshold voltage existing at its input (conductor 101) to switch it from one state of operation to the other. More specifically, with the trigger circuit operating in its first state, upon a voltage being applied to its input which increases from a level below the threshold voltage to the level of the threshold voltage, the trigger circuit is switched abruptly to its second state. On the other hand, with the circuit operating in its second state, it is switched abruptly to its first state upon the voltage at its input decreasing from a level above the threshold voltage to the level of the threshold voltage.

The trigger circuit herein is constructed to be responsive to a threshold voltage having a magnitude which is smaller than the amplitude of the voltage pulses produced by supply 90.

Spiking circuit 94 operates, upon an abrupt change of voltage occurring at its input (conductor 105), to produce a sharp, short-duration voltage pulse or spike at its output (conductor 106). In particular, an abrupt rise of voltage at the circuit's input will result in a sharp, negative output pulse on conductor 106, and an abrupt decrease of input voltage will result in a sharp, positive output pulse.

Switching circuit 96 functions as a normally open electronic switch between conductors 107, 108. The switch closes to connect these conductors whenever the voltage on conductor 107 is positive with respect to that on conductor 108, and simultaneously, a sharp, positive voltage pulse occurs on conductor 106. Once closed, the switch remains closed until there is no longer a difference between the voltage on conductors 107, 108, or until the voltage on conductor 108 becomes positive with respect to that on conductor 107. A sharp, negative pulse on conductor 106 has no effect on the switching circuit.

Turning now to other circuits illustrated in FIG. 3, in block form at 112 is a rectifier and filter circuit which, together with generator 48, constitutes speed-responsive means herein. At its input, circuit 112 receives the AC output voltage produced by generator 48. Circuit 112 has a positive output terminal grounded at 114, and a negative output terminal connected to conductor 110. The circuit functions to produce at its output terminals a substantially continuous, filtered DC output voltage having a magnitude that is directly related to the amplitude of the voltage fed into the circuit.

Indicated generally at 118 is an accelerator circuit as contemplated herein including a regulated, continuous DC voltage supply, 120, and a potentiometer, or adjustable device, 122. The potentiometer has a resistive winding 122a connected across the positive and negative output terminals of supply 120. The upper end of this winding in FIG. 3 is grounded at 124.

Potentiometer 122 further includes a wiper 122b which is connected to amplifier 86 through previously-mentioned conductor 111. Wiper 122b is suitably ganged to a foot-operated accelerator pedal 128 which is mounted on the truck's frame adjacent the front thereof where it may be conveniently operated by an operator. Pedal 128 is biased upwardly by a spring 128a, and is illustrated in the position that it normally occupies due to the urging of the spring. In this position wiper 122b is held adjacent the upper end of winding 122a in FIG. 3. Downward movement of pedal 128 causes movement of wiper 122b downwardly on winding 122a.

According to the invention, control means 84 responds to voltages on conductors 110, 111 to determine the voltage which is applied to terminals 76 of the clutch. Explaining how this determination occurs, and considering particularly the operation of the control means during a single power pulse of supply 90, initially capacitor 88a is uncharged, trigger circuit 92 is in its first state where the voltage on conductor 105 is zero, and switching circuit 96 acts as an open circuit between conductors 107, 108.

Amplifier 86 compares and sums the voltages supplied to it through conductors 110, 111. Whenever the sum of these voltages is positive, which will occur whenever the magnitude of the voltage on conductor 111 exceeds that of the voltage on conductor 110, then, upon initiation of a power pulse by supply 90, the amplifier enables current to flow through it from conductor 99 to ground. The amount of current which is permited to flow depends, as explained earlier, upon the magnitude of the above-mentioned positive sum, and upon the voltage difference between conductor 99 and ground.

With occurrence of such a power pulse, the voltage on conductors 99, 101 increases initially from a level below to a level above the threshold voltage of trigger corcuit 92, and the trigger circuit switches to its second state. Such switching causes an abrupt rise of voltage on conductor 105, and this in turn results in the production of a sharp, negative voltage spike on conductor 106. Switching circuit 96 remains open, and no voltage is supplied to the clutch's field winding.

With circuit 92 switched to its second state, current flows through charging circuit 88, and capacitor 88a begins to charge at a rate determined by the amount of such current. As the capacitor charges at a given rate, the voltage on conductors 99, 101 drops relative to that on conductor 100 at a corresponding rate.

When the voltage on conductors 99, 101 drops to the level of the threshold voltage for circuit 92, the trigger circuit switches back to its first state. In the preferred such a value that even with very slow charging rates for capacitor 88a, the voltage on conductors 99, 101 drops to the level of the threshold voltage prior to termination of the power pulse.

Such switching of circuit 92 causes a abrupt drop of voltage on conductor 105, and this in turn causes spiking circuit 94 to produce a sharp, positive voltage spike on conductor 106. This switching of circuit 92 also causes dischargeing of capacitor 88a, whereupon the voltage on conductors 99, 101 rises again to the level of the voltage on conductor 100.

This positive spike occurs during the duration of a power pulse, and hence at a time when the voltage on conductor 107 is positive relative to that on conductor 108. Thus, upon occurrence of the spike, curcuit 96 closes between conductors 107, 108, and permits the voltage existing on the former to be supplied through the latter to the clutch's field winding.

With termination of the power pulse, the voltage at the positive output terminal of supply 90, and hence on conductor 107, drops to zero. When this occurs, circuit 96 opens again and cuts off the supply of voltage to field winding 74b.

It will be noted that for a given single power pulse of supply 90, it is only during the interval of time between switching back of circuit 92 from its second to its first state of operation, and termination of the power pulse, that voltage is applied to the clutch's field winding. And it will be apparent that the length of this time interval depends directly upon the voltages which are supplied on conductors 110, 111 to amplifier 86. When the sum of such voltages is positive and large, the amplifier permits a large amount of current to flow through circuit 88, capacitor 88a charges rapidly, and circuit 92 (having first switched to its second state) switches back to its first state relatively soon after initiation of a power pulse. Under such circumstances, the time interval during a given pulse when voltage is supplied to the field winding is relatively long. On the other hand, if the summed voltages result in a small positive sum, capacitor 88a charges slowly, and the resulting time interval during which voltage is supplied to the field winding is relatively short. When the summed voltages result in a sum which is zero or negative, no voltage is supplied to the field winding.

The occurrences just described for a single pulse of supply 90, take place during each successive pulse produced by the supply. Over a given period of time, the average DC voltage supplied to winding 74b is directly proportional to the percentage of that time period that switching circuit 96 is open to permit the supply of voltage. The magnitude of such an average voltage, in turn, determines the strengths of the fields which produce coupling of clutch members 70, 72.

Describing now how the apparatus as a whole operates to propel truck 10, and considering particularly forward propulsion of the truck, shift lever 22a is adjusted to the desired forward speed range, and motor 44 is turned on. Initially, there is no control voltage applied to terminals 76 of the clutch, there are no fields producing coupling of clutch members 70, 72, and hence, there is no torque applied to rotate shaft 50. Thus, shaft 50 remains stationary, no output voltage is produced by generator 48, and no power is transmitted to the front wheels of the truck.

To initiate forward movement of the truck, and to accelerate the same to a given speed, an operator depresses accelerator pedal 128 to move wiper 122b an appropriate distance downwardly in FIG. 3 from the grounded end of winding 122a toward the positive voltage end thereof. Such movement of the wiper results in a given positive voltage being supplied to amplifier 86 through conductor 111. This is the only voltage supplied at this time to the amplifier since generator 48 is not yet producing an output voltage. Hence, the sum of voltages fed to the amplifier is positive, and the amplifier permits current flow therethrough to take place.

With such current flow permitted, during each power pulse produced by supply 90 circuit 96 opens for a short period of time to permit voltage from the supply to be applied to clutch input terminals 76. It will be appreciated that initially the average value of this voltage, and hence the strengths of the fields produced in the clutch, depends solely upon the magnitude of the voltage on conductor 111.

With voltage thus applied to terminals 76, clutch members 70, 72 become coupled together as earlier explained, and shaft 50 rotates under power. Thus, the truck is accelerated to move forwardly over the ground.

With rotation of shaft 50, generator 48 produces an AC output voltage which results in a negative DC voltage being supplied from circuit 112 to amplifier 86 through conductor 110. This negative voltage initially is smaller than the positive voltage on conductor 111, and, when added algebraically to the latter voltage, reduces the net positive voltage supplied to the amplifier. Current flow through the amplifier thus decreases, the average DC voltage applied to field winding 74b is reduced, and the driving torque exerted on clutch member 72 decreases.

The truck accelerates until shaft 50 reaches such a speed where the magnitude of the voltage on conductor 110 equals that of the voltage on conductor 111. When this occurs, no voltage is supplied to field winding 74b, and hence, no driving torque is transmitted through the clutch to shaft 50. This is the equilibrium condition which tends to be reached, and any drop in the speed of shaft 50 from the speed existing at this equilibrium condition tends immediately to produce a voltage in the field winding restoring the equilibrium condition. In effect a substantially constant speed is attained in the truck.

To speed up the truck, the operator depresses pedal 128 to place wiper 122b closer to the positive voltage end of winding 122a. Conversely, to slow the truck, the operator allows the pedal to elevate under the action of spring 128a, whereupon wiper 122b moves toward the grounded end of winding 122a. Further speed variations are possible by operating shift lever 22a to change the speed range of transmission 22.

When very slow or inching speeds are desired, transmission 22 is shifted to its lowest speed range, and pedal 128 is just slightly depressed to produce a very small positive voltage on conductor 111. With the drive means illustrated, it has been found possible to propel a vehicle, such as truck 10, so slowly that movement is barely perceptible.

Through proper adjustment of transmission 22, truck 10 may be propelled similarly in a reverse direction.

Thus, drive means is provided herein for a vehicle which affords a substantial degree of control over the speed at which the vehicle travels. By adjusting the voltage applied to clutch input terminals 76 to control coupling of the clutch members, a vehicle may readily be made to travel at various speeds over the ground, ranging from those where it barely inches along to those where it moves fairly rapidly. Such speed adjustment is accomplished without requiring any high degree of operating skill, and without frictional wear and damage of the type encountered with known friction-type clutches.

At whatever speed a vehicle is set to travel, control means 84, in cooperation with generator 48 and accelerator 118, functions automatically to maintain the vehicle speed substantially constant so long as the torque load placed on motor 44 does not exceed the rated capacity of the motor. Within the capacity of the motor, vehicle speed is substantially unaffected by variations in terrain over which the vehicle travels. Thus, a smooth, safe ride is provided for any load carried by the vehicle.

Additional control over vehicle speed, more particularly in decelerating of the vehicle, is provided by the brake system including brake pedal 25. If desired, of course, the brake system and the accelerator may be used simultaneously to provide complete control over uneven terrain.

While a preferred embodiment of the invention has been described herein, it is appreciated that variations and modifications may be made without departing from the spirit of the invention. Accordingly, it is desired to cover all such variations and modifications that would be apparent to those skilled in the art, and which come within the scope of the appended claim.

It is claimed and desired to secure by Letters Patent:
1. In a self-propelled load-handling vehicle having a frame and ground-traveling support means supporting the vehicle for movement over the ground, adjustable speed-regulated drive means for propelling the vehicle at different selected substantially constant speeds, comprising
   an electrically powered prime mover mounted on said frame,
   power-transmitting means operatively interconnecting said prime mover and said ground-traveling support means for transmitting power from the former to the latter to propel the vehicle, said power-transmitting means including an electromagnetically coupled clutch with a magnetic field which is adjustable to control the coupling of the clutch and thereby the amount of power transmitted therethrough from said prime mover to said ground-traveling support means,
   a change speed transmission, adjustable by an operator to effect a change in the range of speed at which the vehicle travels, and
   speed-responsive means responsive to the speed of the vehicle operatively connected to said clutch for effecting adjustment of its magnetic field as the speed of the vehicle changes from a given selected speed thereby to tend to maintain the speed of the vehicle substantially constant, said clutch being located intermediate said prime mover and said change speed transmission, and said speed-responsive means being connected to the power-transmitting means between the clutch and transmission so as to be responsive to speeds occurring in said power-transmitting means intermediate said clutch and said transmission.

References Cited

UNITED STATES PATENTS

| | | | |
|---|---|---|---|
| 2,653,841 | 9/1953 | Davies et al. | |
| 2,788,104 | 4/1957 | Mason | 192—84 |
| 2,850,654 | 9/1958 | Jaeschke | 310—94 |
| 3,073,422 | 1/1963 | Baumann | 192—3.5 |
| 3,202,234 | 8/1965 | Osborne | 180—65 |
| 3,374,374 | 3/1968 | Smith | 310—94 |

KENNETH H. BETTS, Primary Examiner

U.S. Cl. X.R.
180—65; 310—94